Feb. 28, 1939. W. E. WUNDERLICH 2,148,889
BEDSPRING
Filed April 2, 1936
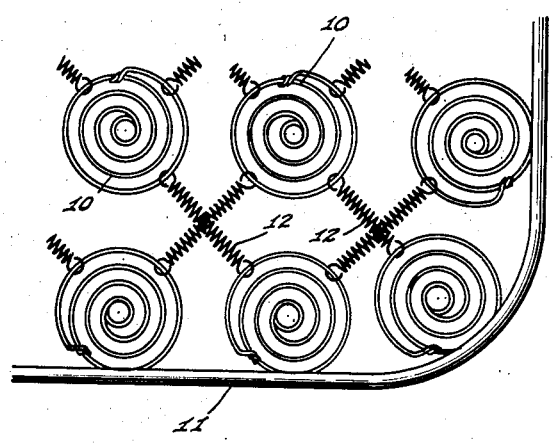
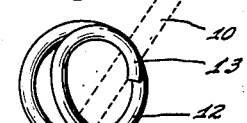
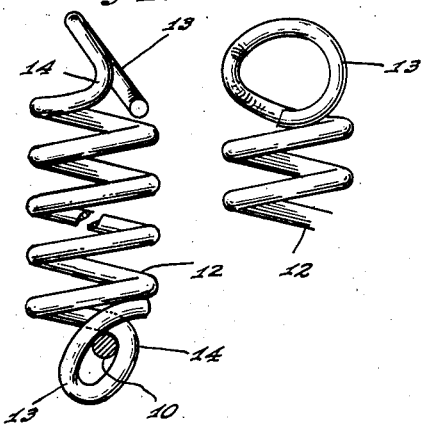
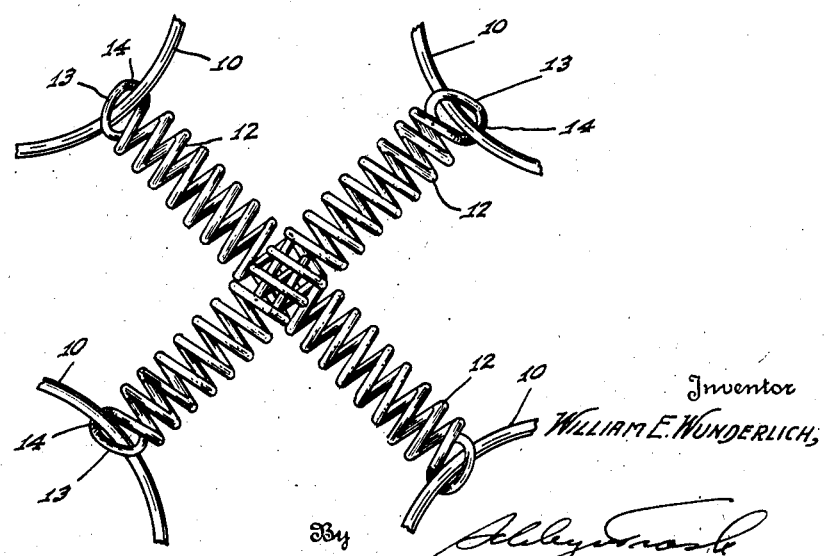
Inventor
WILLIAM E. WUNDERLICH
By
Attorneys Patented Feb. 28, 1939

2,148,889

UNITED STATES PATENT OFFICE 2,148,889

BEDSPRING

William E. Wunderlich, Muncie, Ind., assignor to The Moore Company, Muncie, Ind., a corporation of Indiana Application April 2, 1936, Serial No. 72,275

2 Claims. (Cl. 5—269)

My invention relates to bed-spring assemblies, or "bed-bottoms", adapted to support a mattress, and is particularly concerned with that type of spring assembly in which a series of rows of vertical compression springs have their upper end turns tied together by diagonally extending, crossed helical springs of relatively small diameter. One of the problems to be met in the production of such a bed bottom is the provision of satisfactory means for attaching each end of each helical spring to the associated upper end turn of a compression spring. For the sake of reduced production cost, it has been customary to form each end of each helical spring with an eye or hook embracing the wire of the associated compression spring. A disadvantage of such an arrangement is that relative movement of the upper ends of directly interconnected compression springs, especially relative movement of such springs toward each other, tends to dislodge the hooks or eyes in the ends of the helical springs. To prevent this it is customary to form each helical spring so that it is subjected to a considerable degree of longitudinal tension when in place in order to maintain its hooks seated on the associated compression springs when such compression springs move toward each other. However, when the helical springs are subjected to sufficient axial tension to prevent dislodgment of the hooks or eyes, the compression springs at the edges of the assembly are drawn inwardly with a force frequently sufficient to distort the border frame to which their end coils are connected.

It is the object of my invention to overcome the above noted disadvantages of prior constructions. More specifically, it is my object to form the helical springs with attaching hooks of such a shape and arrangement that they will remain firmly seated in association with the compression springs irrespective of relative movement of the compression springs and without the necessity for stressing the helical springs in such a way as to distort the border frame of the assembly.

In carrying out my invention I bend the wire at each end of the helical springs to form an arcuate hook approximately 270° in angular extent and disposed approximately in a plane making an acute angle with the immediately adjacent helical-wound portion of the wire. When the helical spring is in place in the assembly, the wire of the upper end turn of one of the compression springs will pass through this hook to be snugly received in the acute angle just referred to. The hooks at the two ends of each helical spring are so relatively disposed about the spring-axis that when they are engaged with wires lying in the same plane the helical spring will be distorted torsionally in such a way that the elasticity of the spring material will tend to force the engaged wire into the acute angle between the body of the spring and the hook and hold it there.

The accompanying drawing illustrates my invention: Fig. 1 is a fragmental plan view of a bed-bottom or spring-assembly; Fig. 2 is an elevation on an enlarged scale of one of the helical springs disassociated from the assembly and in unstressed condition; Fig. 3 is a front elevation of the spring shown in side elevation in Fig. 2; Fig. 4 is an end elevation of the spring shown in Fig. 2; and Fig. 5 is a fragmental plan view generally similar to Fig. 1 but on an enlarged scale.

The spring-assembly illustrated in Fig. 1 comprises a suitable frame (not shown) to which are attached the lower ends of compression springs 10 arranged in a series of parallel rows. Usually, as indicated in the drawing, the compression springs 10 are either conical or hour-glass in shape and have their upper end turns substantially co-planar. A border frame 11 surrounds the spring assembly in the plane of the upper end turns of the springs 10 and is secured to the upper end turns of the outer springs. Within the border frame 11, the springs 10 are yieldingly held in proper relative position by means of helical springs 12. These springs 12 are arranged in pairs, with the two springs in each pair threaded together so that they cross approximately perpendicularly, and the two ends of each helical spring are connected to the upper end turns of diagonally opposite compression springs 10. As above indicated, my invention relates particularly to the method by which the ends of the helical springs 12 are connected to the upper end turns of the springs 10.

As is clear from Figs. 2, 3, and 4, the wire of each helical spring 12 is formed at the end of the spring in a hook 13 which is disposed generally in a plane at an angle to the axis of the helical spring and has, in its plane, an arcuate shape of approximately 270° in extent. The angle between the plane of the hook 13 and the immediately adjacent helically-wound wire-portion with which it is continuous is conveniently somewhat less than a right angle, as is clear from Fig. 2, to provide an acute-angle bend 14. The extreme end of the hook is formed to be approximately tangential to the last helical turn of the spring 12, as shown in Fig. 3, and to terminate near the point of tangency.

Each of the springs 12 is formed to be substantially unstressed axially when in place in the assembly. Provision is made, however, for insuring that each helical spring will be stressed torsionally when the hooks at its opposite ends engage the co-planar end turns of two compression springs 10. This result is secured by disposing the two hooks of each helical spring in the manner illustrated in Fig. 2. There, the hook at the lower end of the spring is shown as engaging an end turn of a compression spring 10 at a point where the wire of such end turn occupies a position substantially normal to the plane of the drawing. It is evident from Fig. 2 that in order for the hook at the upper end of the spring 12 to engage a wire normal to the plane of the drawing the upper end of the spring will have to be rotated (counterclockwise in Fig. 4) from the position illustrated. Such rotation of the upper end of the spring relative to the lower end will introduce a torsional stress serving to keep each hook firmly engaged with its associated compression spring, the wire of which, as the result of the forces exerted upon it by the hook, will be forced to seat in the acute-angle bend 14 between the hook and the body of the spring. A pair of crossed helical springs 12 are shown in Fig. 5 as having the hooks at their ends thus seated in engagement with the upper end turns of compression springs 10.

With this arrangement, I find that relative movement of the upper ends of the springs 10 will not result in unseating the hooks or in causing the ends of the helical springs 12 to ride over or under the end turns of the compression springs. At the same time, this result is secured without subjecting the helical springs 12 to axial tension sufficient in extent to distort the border frame 11.

In attaching an end of each helical spring to the end turn of the associated compression spring 10, the end of the helical spring is brought into association with the end turn of the spring 10 in the manner illustrated in Fig. 4, where an end turn of a compression spring is indicated in dotted lines. In this position, the end turn of the compression spring is received between the body of the helical spring 12 and the free end of the hook 13; and the helical spring is forced laterally of itself to cause the free end of the hook 13 to pass over the wire of the compression spring which will then extend through the hook as indicated in the case of the hook at the lower end of the helical spring in Fig. 2. Preferably, the helical springs are so attached that the free ends of the hooks are beneath the plane of the upper surface of the spring assembly, where they can do no damage to a mattress supported on the assembly.

In the complete assembly, a portion of which is shown in plan in Fig. 5, the bend 14 at each end of each helical spring seats from below against the wire of the upper end turn of one of the compression springs. The hook 13, which passes through the plane of the end turn of the compression-spring, engages such compression-spring turn on its inner surface, while the outer surface of the compression-spring turn is engaged by the end of the body of the helical spring. Thus provision is made for transmitting between the compression-spring turn and its associated helical spring forces in either direction along the axis of the helical spring. The hook 13, near its end, engages the compression-spring turn from above at a point spaced from the bend 14, whereby the torsional stress in the helical spring tends to maintain the bend 14 firmly seated on the wire of the compression-spring turn. As a result, the ends of each helical spring are compelled to follow the upper ends of the associated compression springs in their relative movement, even when that relative movement is in a direction to shorten the helical spring; and any tendency of the end of the helical spring to "ride" over the compression-spring turn is effectively counteracted.

The extent to which the two ends of each helical spring must be rotated relatively to be brought into association with the co-planar end turns of associated compression springs may vary widely. I have found a rotation of about 12° to be satisfactory in the average bed-bottom now on the market.

I claim as my invention:

1. In a bed-bottom having a plurality of rows of compression springs provided with approximately co-planar end turns, open-wound helical springs arranged in crossed pairs, the wire of each helical spring at each end thereof being formed into an arcuate hook disposed generally in a plane at an angle to the spring-axis and having near its extreme end a portion disposed approximately tangentially to the end of the body of the helical spring, the wire of the spring being bent at an acute angle where the hook joins the body of the spring, the hooks at the ends of each helical spring engaging the end turns of diagonally opposite compression springs and being so relatively disposed about the axis of the helical spring that when in place in the assembly the helical spring will be torsionally strained to cause each of said acute-angle bends to be firmly seated on the associated compression-spring turn.

2. In a bed-bottom having a plurality of rows of compression springs provided with approximately co-planar end turns, open-wound helical springs arranged in crossed pairs, the wire of each helical spring at each end thereof being formed into an arcuate hook disposed generally in a plane at an angle to the spring-axis, the wire of the spring being bent at an acute angle where the hook joins the body of the spring, the hooks at the ends of each helical spring engaging the end turns of diagonally opposite compression springs and being so relatively disposed about the axis of the helical spring that when in place in the assembly the helical spring will be torsionally strained to cause each of said acute-angle bends to be firmly seated on the associated compression-spring turn.

WILLIAM E. WUNDERLICH.